United States Patent [19]

Koellisch

[11] 4,025,676

[45] May 24, 1977

[54] COMPOSITE SKID CONSTRUCTION FOR MOVING HEAVY OBJECTS

[76] Inventor: Glenn M. Koellisch, 7482 Reno Drive NE., Louisville, Ohio 44641

[22] Filed: Sept. 1, 1976

[21] Appl. No.: 719,584

Related U.S. Application Data

[63] Continuation-in-part of Ser. No. 606,743, Aug. 22, 1975, abandoned.

[52] U.S. Cl. .................. 428/40; 428/167; 428/321; 428/323; 428/484; 248/9; 248/22
[51] Int. Cl.² ............... B32B 7/06; B32B 3/30; B32B 5/18; F16F 15/00
[58] Field of Search ............ 428/40, 310, 316, 484, 428/167, 319, 321, 323; 248/9, 19, 21, 22

[56] References Cited

UNITED STATES PATENTS

| | | | |
|---|---|---|---|
| 2,215,743 | 9/1940 | Saurer | 248/22 |
| 3,018,991 | 1/1962 | Slayter | 248/22 |
| 3,332,646 | 7/1967 | Kellett | 248/22 |
| 3,342,447 | 9/1967 | Marsh | 248/21 X |
| 3,866,073 | 2/1975 | Gjaja | 248/22 X |
| 3,922,408 | 11/1975 | Smith | 428/40 |

*Primary Examiner*—Philip Dier
*Attorney, Agent, or Firm*—Frease & Bishop

[57] ABSTRACT

A skid for slidably supporting and moving heavy objects. The skid has an elongated load bearing strip of hard fiber-board material with a strip of cushioning material bonded to the top surface of the load bearing strip. A strip of flexible tape-like material having pressure sensitive adhesive on the top surface is bonded to the top surface of the cushioning material. The top adhesive surface of this material is adapted to secure the skid to the bottom portion of an object. The bottom surface of the load bearing strip is covered with a hard, smooth glossy surface when the object is adapted to rest on a floor having a soft covering. Alternatively, the bottom surface is covered with a moisture resistant, static-free, wax impregnated, matted fiber fabric when the object is adapted to rest on a floor having a hard covering or finish. The load bearing strip also may be formed with a plurality of transversely extending grooves to facilitate separation of the skid into a plurality of smaller skid-like sections.

7 Claims, 15 Drawing Figures

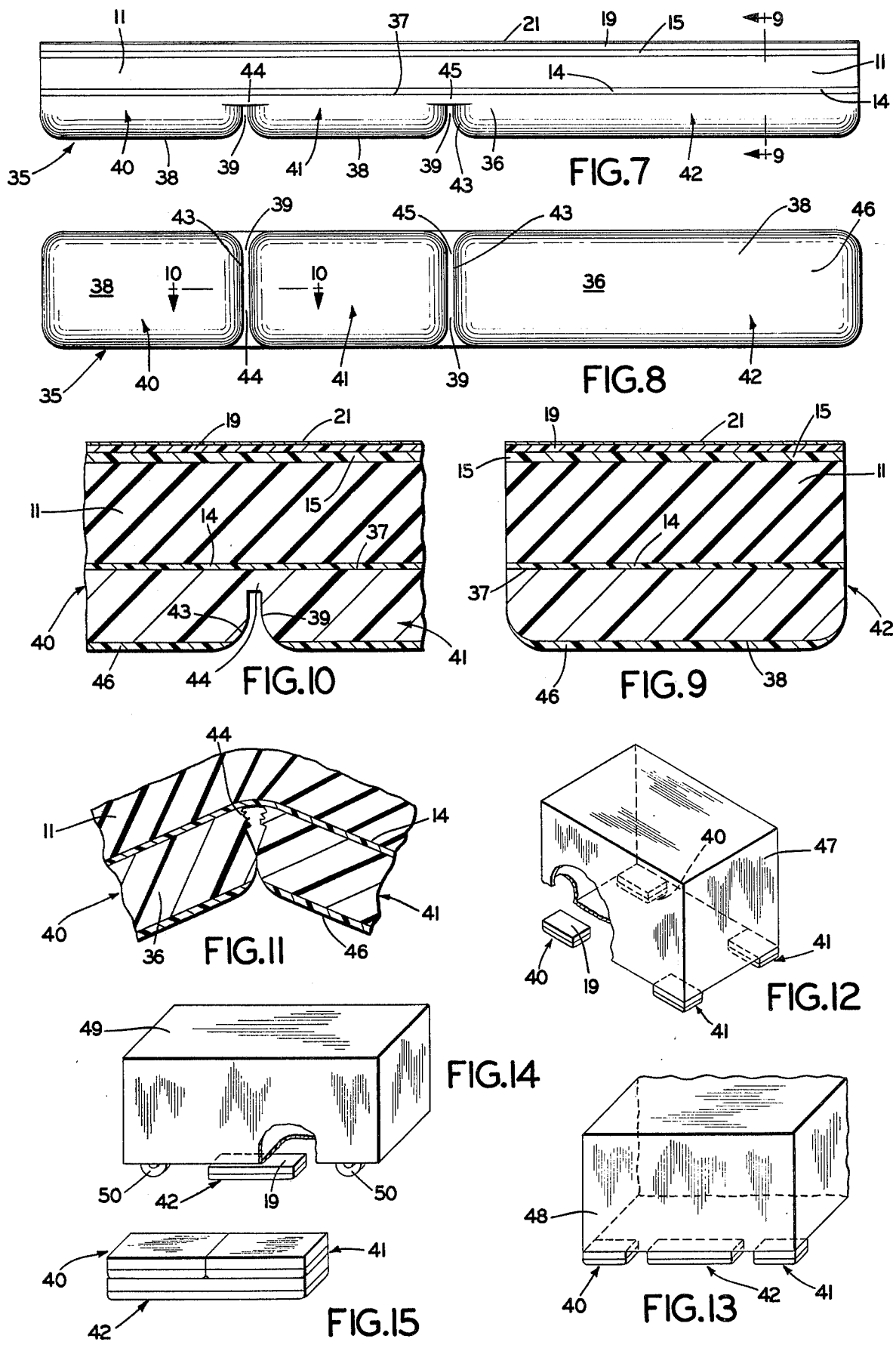

COMPOSITE SKID CONSTRUCTION FOR MOVING HEAVY OBJECTS

CROSS-REFERENCE TO RELATED APPLICATION

This application is a continuation-in-part of my copending application, Ser. No. 606,743, filed Aug. 22, 1975, now abandoned.

BACKGROUND OF THE INVENTION

1. Field of the Invention

The invention relates to skid constructions for moving heavy objects, such as refrigerators, ranges, freezers, filing cabinets and the like. More particularly, the invention relates to a skid construction which is permanently mounted on the base of the object and functions both as a support for the object to prevent damage to the floor beneath, and in turn provides a skid for sliding the object easily from its usual resting place without damaging the floor covering.

2. Description of the Prior Art

Rollers and casters of various types and styles are incorporated either in the original manufacture of an object, or are attached separately to the object to provide both support and movability to the supported object, such as appliances and furniture. Although these rollers and casters have been satisfactory in the past for their intended purpose, a need has been created due to the change in the popular styles of floor coverings and in the changes in furniture and appliance manufacture, for a means to prevent the present rollers and casters from damaging modern-day floor coverings. Likewise, there is a need to facilitate the ease in moving these heavy objects which is lacking in many of the known roller and caster constructions.

The refrigerator as an example, has developed from a 4 to 6 cu. ft. capacity to double or triple this capacity, with a freezer section capable of holding several hundred pounds of frozen food and meat. Likewise, furniture styles have emerged from lightweight dainty-leg styles to heavy, bulky, legless structures which the average person has extreme difficulty in moving on the modern types of floor covering.

Floor covering (carpet) has developed from a fine woven hard-type surface to a softer tufted type of thicker body. Likewise, tile and linoleum have developed from a hard surface, brittle type to a softer cushioned type having a soft backing and a somewhat soft impressionable top surface. The underlayment (padding) also has developed from a hard-hair type to a thick, rubber or urethane, super-soft fabric which causes such heavy appliances and furniture to bury themselves into the soft floor covering and rendering them immobile, even with casters or rollers attached. The casters and rollers tend to increase the immobility of the supported object since they become seated or partially buried in the floor covering due to the extreme concentrated weight compressing the soft covering.

Such soft floor coverings are used extensively today in living rooms, dining rooms, bedrooms, kitchens, laundry rooms and basements of the modern home, as well as in offices, churches, schools and other commercial establishments. This usage has created a demand for a new type of supporting structure which is permanently or temporarily attached to the bottom of such appliances and furniture to prevent these objects from becoming bogged down in the floor covering and reducing immobility, and which provides a means of readily and easily moving the supported objects when desired.

No skid construction of which I am aware provides an extremely simple and inexpensive structure which can be adapted to support heavy objects having various configurations of bases and supporting frames on floor coverings having both soft and hard top surfaces and underlying pads, and which provides for the safe and easy sliding movement of the supported objects across such floor coverings.

Various laminated pad constructions have been developed in the past for a variety of applications, which constructions are formed of various material layers bonded together by an adhesive. U.S. Pat. No. 3,332,646 shows a vibration absorbing member adapted to be mounted on the base of a machine consisting of upper and lower layers of a rubbery material for withstanding vibrations and shocks, with an intermediate rigid layer for spreading the vibrations across its surface to dampen the effects thereof. These vibration pads in turn are adapted to be cemented to the floor to prevent movement of the supported equipment. U.S. Pat. No. 3,922,408 discloses a laminated corner and edge protective cover formed by an intermediate layer of porous foam material which is covered by an outside cover or skin, which combination then is attached to an object by adhesive. U.S. Pat. No. 3,342,447 shows another shock absorbing and load bearing structure for equipment and structures in which a metal plate is bonded between top and bottom layers of rubber, which laminations then are stacked to provide the load bearing elements. U.S. Pat. No. 3,866,073 discloses another type of laminated structure having upper and lower resin impregnated felt material with a thin elastomeric sheet preferably of rubber, being sandwiched between, with the laminations being bonded together by an adhesive. None of these structures, however, provide the particular laminated structure described below for supporting and moving a heavy object across various types of floor coverings.

SUMMARY OF THE INVENTION

Objectives of the invention include providing a skid construction which may be attached readily to the bottom of objects, such as appliances, furniture, etc., permitting the latter to be stably supported without damaging the floor covering, and which permits the supported object to be slidably moved on the floor covering easily and with a minimum of friction and without damaging the covering; providing a skid construction which permits airflow beneath the supported object to prevent accumulation of moisture with the resulting rust and corrosion damage heretofore occurring to the supported object and floor covering; providing a skid construction having a cushioning means reducing vibration and deadening sound when the skid contruction is applied to motor-operated appliances, and which permits an attaching strip of pressure sensitive adhesive to conform to the shape and configuration of the contact area on the supported object to enable a strong bond to be obtained between the skid construction and supported object; providing a skid construction having a wax impregnated, matted or compressed fiber fabric bottom which enables a supported object to be slid easily across a floor having a hard smooth finish and which resists moisture from accumulating on the bottom of the supported object;

and providing a skid construction which is inexpensive to manufacture, sturdy and durable in use and which eliminates difficulties heretofore encountered, achieves the objectives indicated, and solves problems and satisfies needs existing in the art.

These objectives and advantages are obtained by the skid construction for slidably supporting heavy objects, the general nature of which may be stated as including a rigid strip of hard load-bearing material having flat top and bottom surfaces; cushion means mounted on the top surface of the rigid strip; pressure sensitive adhesive means applied to the cushion means for mounting the skid construction on an object to be supported thereby; friction reducing covering means mounted on the bottom surface of the rigid strip being complementary to the type of floor on which the object is to be supported to reduce the sliding friction between the floor and the skid construction; said friction reducing covering means being a hard, smooth, glossy, enamelled material when the object is supported on a floor having a soft surface covering, and said covering means being a moisture-resistant, static-free, wax impregnated, matted fiber fabric when the object is supported upon a floor having a hard surface covering; and a plurality of transversely extending grooves formed in the bottom surface of the load bearing material producing readily fracturable areas for separation of the skid construction into a plurality of smaller skid sections.

BRIEF DESCRIPTION OF THE DRAWINGS

Preferred embodiments of the invention — illustrative of the best modes in which applicant has contemplated applying the principles — are set forth in the following description and shown in the drawings, and are particularly and distinctly pointed out and set forth in the appended claims.

FIG. 7 is a side elevational view of a second embodiment of the improved skid construction;

FIG. 8 is a bottom plan view of the skid construction shown in FIG. 7;

FIG. 9 is an enlarged sectional view taken on line 9—9, FIG. 7;

FIG. 10 is an enlarged, fragmentary sectional view taken on line 10—10, FIG. 8;

FIG. 11 is a reduced elevational side view of a portion of the skid construction of FIGS. 7 and 8 being fractured, preparatory to separation of the joined sections;

FIG. 12 is a perspective view with portions broken away and in section, showing the use of two of the sections of the skid construction of FIG. 7 mounted on the corners of an object being supported thereby;

FIG. 13 is a fragmentary perspective view showing another use of the sections of the skid construction of FIGS. 7 and 8 supporting an object;

FIG. 14 is a fragmentary perspective view with portions broken away showing the longer skid section of FIGS. 7 and 8 mounted on an object to assist the object rollers in supporting the object; and FIG. 15 is a reduced perspective view showing the two shorter skid sections of FIGS. 7 and 8 mounted on the longer section to increase the height of the skid construction.

Similar numerals refer to similar parts throughout the drawings.

DESCRIPTION OF THE PREFERRED EMBODIMENTS

First Embodiment

Figure 1:
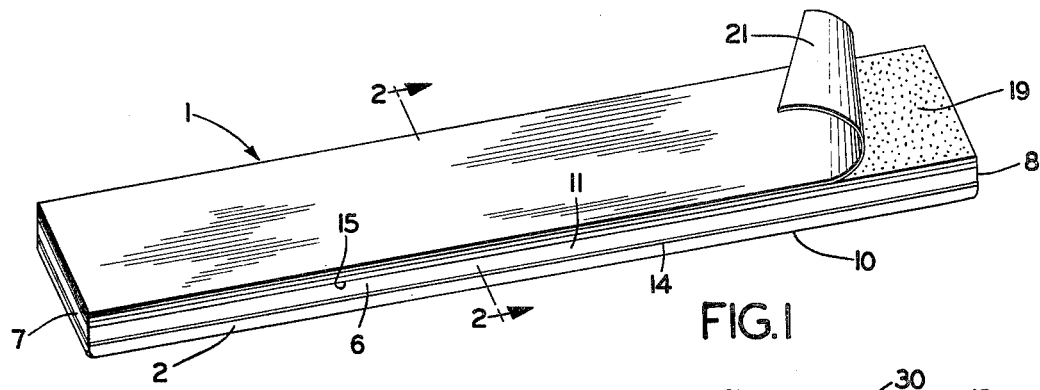
FIG. 1 is a perspective view of the improved skid construction, with a protective sheet of material being partially removed exposing a strip pressure sensitive adhesive.
Figure 2:
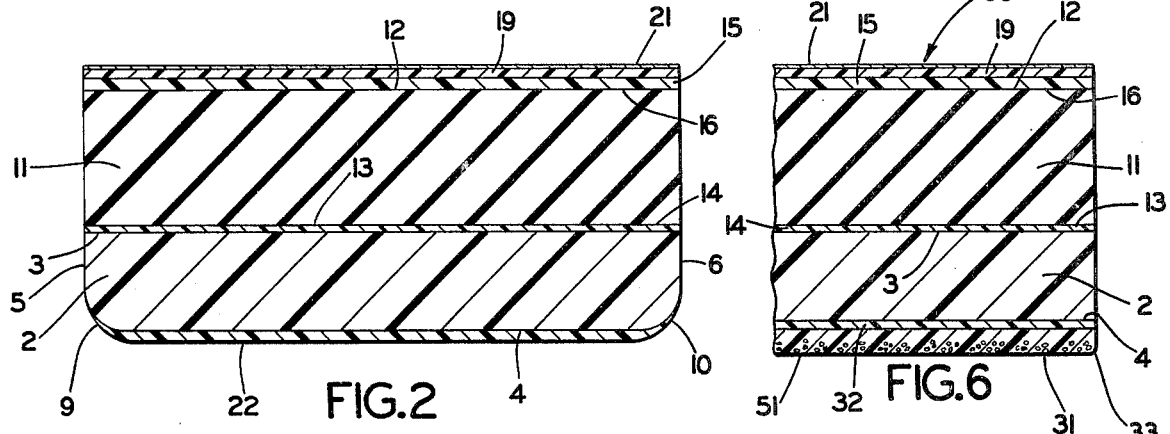
FIG. 2 is a greatly enlarged sectional view taken on line 2—2, FIG. 1.

The improved skid construction is indicated generally at 1, and is shown in FIG. 1. Skid 1 includes a rectangular strip of hard load-bearing material 2 which may be formed of plastic, metal, wood, pressed synthetic material, pressboard or the like. Load bearing strip 2 has generally flat top and bottom surfaces 3 and 4, side edges 5 and 6, and end edges 7 and 8, (FIGS. 1 and 2). The bottom portions of side edges 5 and 6 and end edges 7 and 8 preferably are rounded at 9 and 10, respectively, to facilitate movement of skid 1 over a supporting surface.

A strip of cushioning material 11 having top and bottom surfaces 12 and 13 is attached to top surface 3 of load bearing strip 2 by an adhesive 14 or other bonding agent (FIG. 2). Cushion 11 preferably is formed of polyurethane, neoprene, foam rubber, or other similar synthetic materials which reduce vibration and noise when skid 1 is mounted on vibrating type objects, such as refrigerators, washers, dryers and similar motor driven appliances.

A strip of flexible material 15 preferably has its bottom surface 16 heated and bonded to top surface 12 of cushion 11. Strip 15 may be formed of a plastic or vinyl type material so that the bonding forms a plastic-like moisture proof film or layer between cushion 11 and material 15.

A layer 19 of pressure sensitive adhesive is formed on the top surface of material 15. Adhesive 19 is covered by a strip of thin, flexible paper-like material 21 prior to the mounting of skid 1 on an object to protect adhesive 19 prior to use. Material 15 also may have a pressure sensitive adhesive on its bottom surface for bonding to cushion 11 instead of requiring a heat bond, without departing from the concept of the invention.

The bottom surface 4 of load bearing strip 2 is covered with a hard, smooth glossy coating 22 (FIG. 2) when skid 1 is mounted on an object which rests on a soft floor covering. The hard smooth coating 22 provides a minimum of sliding friction between skid 1 and a soft floor covering such as carpeting, rugs and the like. Coating 22 preferably is a painted or baked on enamel finish, or may be an integral bottom surface of a load bearing strip 2, such as a highly polished surface of a metal strip. Also coating 22 may be in the form of a rigid plastic sheet, or similar sheet materials such as sold under the trademarks Formica or Masonite.

Figure 3:
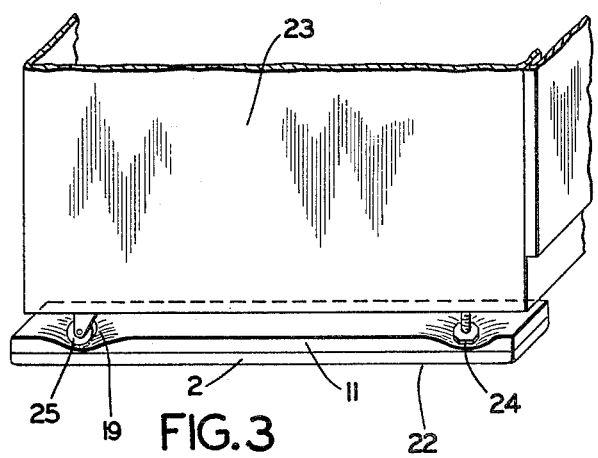
FIG. 3 is a fragmentary diagrammatic perspective view with portions broken away and in section, showing the improved skid construction supporting a heavy object.
Figure 5:
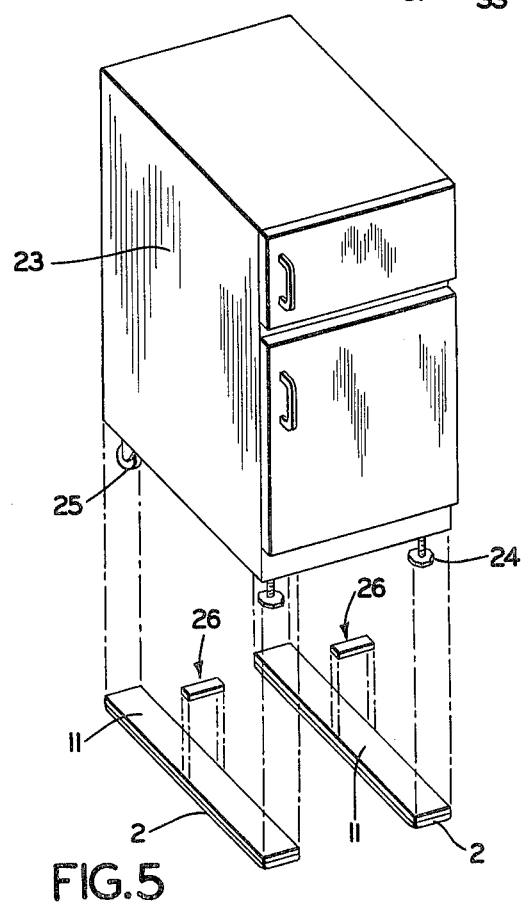
FIG. 5 is an exploded perspective view showing an object being supported by a pair of the skid construction of FIG. 1 and by a pair of auxiliary chock blocks of FIG. 4.

Skid 1 is shown in FIG. 3 supporting an object 23, illustrating one manner in which skid 1 may be used. Skid 1 preferably has an elongated rectangular configuration as shown in FIGS. 1 and 5 and extends between the front and rear support 24 and 25 of a supported object 23. Rear support 25 is illustrated as being a roller, with front support 24 being a screw-threaded adjustable leveling leg, both types of which are used for many appliances, such as refrigerators, washers, dryers, etc.

Regardless of the type of support used for an appliance (roller or leveling leg) the support will adhere to pressure sensitive adhesive 19 and will compress cushion 11. This compression provides a type of self-leveling effect on supported object 23, and enables the adhesive strip to conform to and around the support area of object 23 to insure a firm bond between object 23 and skid construction 1. The weight of object 23 is transmitted through supports 24 and 25 to load bearing strip 2 which distributes the weight somewhat along the length of strip 2.

Skid 1, also can be attached directly to the bottom frame of an object 23 which is not equipped with rollers or leveling legs, or in those situations where the rollers or legs can be removed or retracted. The broad area of the frame in most instances, provides a better surface for gripping and adhering to adhesive 19. Likewise, furniture, filing cabinets, etc., provide broad areas for contact with adhesive 19. A pair of skids 1, as shown in FIG. 5, is required for most installations to provide sufficient and evenly spaced support for object 23, and to provide a pair of runners for slidably moving the object from its resting place for cleaning, repair, etc.

Figure 4:
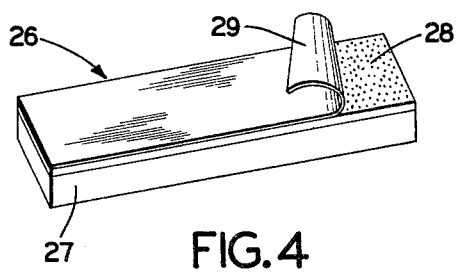
FIG. 4 is a perspective view showing an auxiliary support chock block which may be used in conjunction with the improved skid construction of FIG. 1.

It has been found desirable in some installations to provide intermediate chock blocks 26 where the object supported is extremely heavy, such as refrigerators, freezers and washers, and where skid 1 extends between widely spaced front and rear supports, such as supports 24 and 25 (FIG. 5). The central portion of skid 1 may have a tendency to bow upwardly due to the concentrated force on the front and rear ends of skid 1 exerted by leveling leg 24 and roller 25. One or more chock blocks 26 (FIG. 4) mounted on the central area of skid 1 engages the frame of object 23 preventing such upward bowing and maintains a broad contact area of bottom surface coating 22 with the floor covering.

Chock blocks 26 (FIG. 4) preferably are rectangular pieces of wood 27 or other rigid material having a strip of pressure-sensitive adhesive 28 attached to the top surface. A strip 29 of paper-like material preferably is attached to adhesive 28 to protect the adhesive until the chock block is attached to object 23. The bottom surface of the block 26 is secured to skid 1 by adhesive strip 19 and is mounted on object 23 by adhesive strip 28 to finally secure skid 1 to object 23. A plurality of blocks 26 may be stacked in order to engage an intermediate frame portion, if necessary.

Figure 6:
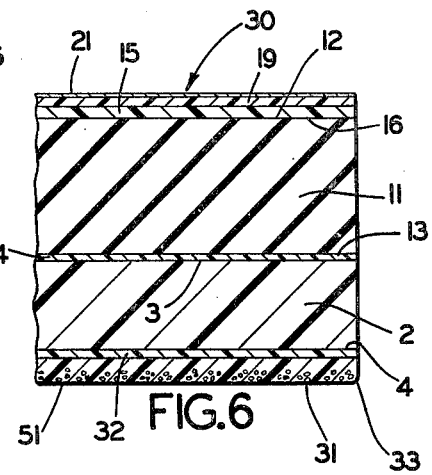
FIG. 6 is a greatly enlarged fragmentary sectional view similar to FIG. 2 showing a modified form of the improved skid construction.

A slightly modified form of the invention is shown in FIG. 6, and is indicated generally at 30. In accordance with one of the features of the invention, a strip of material 31 is mounted on bottom surface 4 of load bearing strip 2 by an adhesive 32. Material 31 replaces the hard, smooth surface 22 of skid construction 1 and provides a low-friction surface when the skid contruction is used for supporting an object on a hard finish covering, such as cushioned vinyl, tile, linoleum, concrete, wood, etc. The corners 33 of the load bearing strip preferably extend vertically between the top and bottom surfaces 3 and 4 instead of being curved or rounded as edges 10 in FIG. 2.

Material 31 preferably is formed of a matted or compressed fiber fabric, such as felt formed of wool or cotton fibers. Material 31 also may be a matted or compressed fabric formed of numerous types of synthetic fibers or materials, such as rayon, nylon, polypropylene, polyester, etc. Material 31 also may be a needle punched or tufted fabric formed from the various natural and synthetic fibers set forth above.

Various other natural and synthetic fibers equivalent in characteristics and properties to those set forth above could be used in forming material 31 and perform satisfactorily within the concept of the invention. Most of these materials are static-free and resist the accumulation of moisture thereby preventing the formation of an unsanitary, germ and odor producing area. Likewise, the accumulation of moisture is reduced or prevented on the bottom of many supported objects, especially smooth flat bottom objects, by providing an air space for the flow of air between the object bottom and floor.

In further accordance with the invention, it has been found that impregnating material strip 31 with a wax 51 greatly enhances the ease of moving a supported object over a floor with modified skid construction 30. Wax 51 preferably is granulated and is of the type used for bowling alleys, shuffle boards, dance floors, etc. One such type wax is sold under the trademark Sun-Glo by the Sun-Glo Corporation of Belleville, New Jersey. This granulated wax will maintain its friction reducing qualities and will not dry out or become sticky over extended periods of time. Furthermore, it will not scratch or mar the floor finish upon movement of the supported object by skids 30.

Second Embodiment

A second embodiment of the skid construction of the invention is indicated generally at 35, and is shown in FIGS. 7–12. Skid construction 35 is similar in most respects to constructions 1 and 30, and includes top protective paper-like material 21, pressure-sensitive adhesive 19, adhesive-coated material strip 15, and cushion 11. Cushion 11 of skid construction 35 is bonded to a modified strip of load-bearing material 36 by adhesive 14.

Load-bearing strip 36 has a flat top surface 37 to which cushion 11 is bonded, and a bottom surface 38 formed with a plurality of transversely extending notches or grooves 39 (FIGS. 7 and 8). Grooves 39 extend into strip 36 a distance of approximately three-quarters the thickness of the strip dividing it into a plurality of individual, readily detachable, skid pads or sections 40, 41, and 42. Sections 40–42 are maintained joined by thin connecting strips 44 and 45 (FIG. 8) which are integral portions of load bearing strip 36. Sections 40–42 preferably have rounded transversely extending corners 43 (FIG. 10) which form grooves 39.

Skid construction 35 enables three individual skid sections 40–42 or pads to be produced easily from the configuration of FIG. 7 by fracturing connecting strips 44 and 45 between each section as shown in FIG. 11. Strips 44 and 45 can be separated easily by hand by several back-and-forth movements of the sections being separated. The remaining upper layers of cushion 11 and strips 15 and 21 can be separated easily by cutting with a knife or other sharp object.

Sections 40–42 have the same characteristics as do skid constructions 1 and 30 with a bottom coating of a hard smooth glossy enamel finish 46 (FIGS. 9 and 10), similar to coating 22 or a strip of moisture-resistant, matted fiber material as shown in FIG. 6, depending upon the type of floor covering on which the object is placed. FIG. 12 shows sections 40 and 41 after separation from a pair of integral skids 35 of FIG. 7 located on the corners of a filing cabinet 47 or the like. Sections 40 and 41 are mounted on the bottom of cabinet 47 by the top layer 19 of pressure-sensitive adhesive.

Skid sections 40–42 may be various lengths, with section 42 being shown in the drawings as twice the length of equal length sections 40 and 41, without departing from the concept of the invention.

FIGS. 13–15 illustrate various additional ways in which sections 40–42 can be utilized for slidably supporting objects. Skid 35 can be separated into sectios 40, 41 and 42 and spaced along the bottom of an object 48 as shown in FIG. 13, when object 48 is longer than the skid. Likewise, skid section 42 provides an intermediate support for object 48 when it is heavier than the type of object shown in FIG. 12 in order to more evenly distribute the weight.

FIGS. 12 and 13 also illustrate how the skid constructions raise a supported object above a floor to permit the movement of air therebetween to prevent the accumulation of moisture.

Longer skid section 42 also may be mounted to the base of an object 49 (FIG. 14) between a pair of supporting rollers 50 to assist rollers 50 in supporting the load and to prevent the rollers from skinking into a soft floor covering. Sections 40–42, likewise, may be arranged in a stacked configuration (FIG. 15) and utilized as in FIG. 14 in those installations where additional height is needed to prevent the rollers or other supports from sinking into the floor covering.

IN GENERAL

Skid constructions 1, 30 and 35, thus provide an extremely simple and inexpensive device which can be attached easily without tools or additional components, to the bottom walls or frames of objects having various shapes, sizes, configurations, etc. with or without existing supporting rollers, legs, casters and the like; provides a construction having a hard load bearing strip of various inexpensive readily available material which can absorb a supported load without breaking, which in turn has a top layer of cushioning material which assists in positioning and leveling the supported object, provides anti-vibration and sound deadening characteristics, and enables the attaching strip of pressure-sensitive adhesive to conform to the surface of the supported object to insure a secure bond therebetween and to reduce premature separation of the skid from the supported object; provides a construction in which the peripheral edge of the load supporting strip may be vertical or have rounded corners to facilitate movement over various types of floor coverings in an easy and safe manner; provides a construction that provides a stable supporting foundation for objects which permits the flow of air under the object to prevent moisture build-up, rust and corrosion to the objects and floor covering; provides a construction which is moisture resistant, preventing conduction of moisture through the various layers of the skid construction and into the supported object; providing a construction which can be manufactured in various lengths or which can be sized at the time of installation to conform to the particular object being supported; and providing a construction which eliminates difficulties existing in the art and which achieves the stated objectives and solves problems that have existed in the art.

In the foregoing description certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved constructions illustrated and described herein are by way of example, and the scope of the present invention is not limited to the exact details of the constructions shown or described.

Having now described the features, discoveries and principles of the invention, the manner in which the skid construction is constructed, assembled and operated, the characteristics of the new construction, and the advantageous, new and useful results obtained; the new and useful structures, devices, elements, arrangements, parts, and combinations are set forth in the appended claims.

I claim:

1. Skid construction for supporting a heavy object and for slidably moving said object over a surface having a hard finish including:
   a. an elongated rectangular strip of stiff load-bearing material having top and bottom surfaces;
   b. a strip of resilient cushioning material having top and bottom surfaces, said bottom surface being bonded to the top surface of the load-bearing strip;
   c. pressure sensitive adhesive applied to the top surface of the strip of cushioning material for mounting the skid construction on a bottom portion of an object to be supported by said skid contruction;
   d. a strip of matted fiber fabric bonded to the bottom surface of the load-bearing strip; and
   e. wax impregnated into the strip of matted fiber fabric to facilitate the sliding of a supported object over a hard finish surface.

2. The skid construction defined in claim 1 in which a plurality of grooves are formed in the bottom surface of the load-bearing strip and extend transversely across the entire width of said strip; and in which said grooves facilitate separating of the strip at the groove location to form a plurality of smaller skid sections.

3. The skid construction defined in claim 1 in which a strip of readily removable flexible material is applied to the top surface of the pressure sensitive adhesive to protect said adhesive until the skid construction is mounted on an object.

4. The skid construction defined in claim 1 in which the matted fiber fabric is formed of compressed wool fiber felt.

5. The skid construction defined in claim 1 in which the matted fiber fabric is formed of fibers from the group consisting of polypropylene fibers, polyester fibers, nylon fibers and rayon fibers.

6. The skid construction defined in claim 1 in which the resilient cushioning material is from the group consisting of polyurethane, neoprene and foam rubber.

7. The skid construction defined in claim 1 in which the wax impregnated in the fabric strip is in granular form.

* * * * *